F. WEINEL.
NUT LOCK.
APPLICATION FILED OCT. 13, 1909.
947,069.
Patented Jan. 18, 1910.
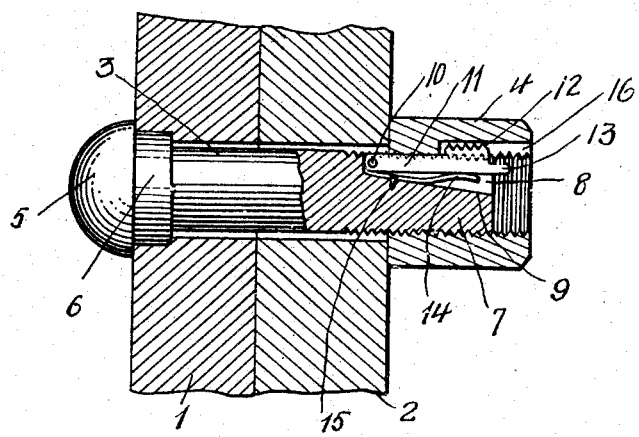
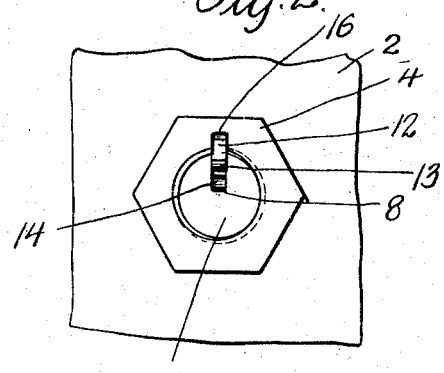
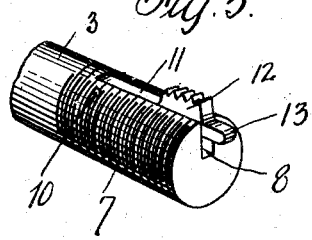
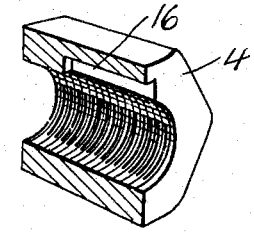
Witnesses:—
Samuel Payne
L. H. Butler
Inventor
F. Weinel.
by
H. C. Everett Co.
Attorneys.

UNITED STATES PATENT OFFICE.

FRANK WEINEL, OF LEECHBURG, PENNSYLVANIA.

NUT-LOCK.

947,069.  Specification of Letters Patent.  Patented Jan. 18, 1910.

Application filed October 13, 1909. Serial No. 522,434.

*To all whom it may concern:*

Be it known that I, FRANK WEINEL, a citizen of the United States of America, residing at Leechburg, in the county of Armstrong and State of Pennsylvania, have invented certain new and useful Improvements in Nut-Locks, of which the following is a specification, reference being had therein to the accompanying drawing.

This invention relates to a nut lock, and the objects of my invention are to provide a bolt with positive and reliable means for retaining a nut thereon, and to provide a nut lock that can be advantageously used in connection with rail joints, bridges, rolling stock and structures subjected to vibrations which have a tendency to loosen nuts upon bolts.

Other objects of my invention are to provide a nut locking device that can be released when it is desired to remove a nut from a bolt without destroying either the bolt or the nut, and to provide a nut lock that can be manipulated and installed by unskilled labor.

Further objects of my invention are to accomplish the above results by a nut locking device that is simple and durable, and to obviate the necessity of using detachable elements, as washers and jam nuts for securing a nut upon a bolt.

These and such other objects as may hereinafter appear are attained by the novel construction, combination and arrangement of parts to be hereinafter specifically described and then claimed.

Reference will now be had to the drawing illustrating a preferred embodiment of my invention, wherein:

Figure 1 is a longitudinal sectional view of the nut lock, Fig. 2 is an end view of the same, Fig. 3 is a perspective view of the end of a bolt adapted to form part of the nut lock, and Fig. 4 is a perspective view of a portion of a nut constructed in accordance with my invention.

In the accompanying drawing 1 and 2 denote, by the way of an example, two pieces of material adapted to be secured together by a bolt 3 and a nut 4. The bolt 3 adjacent to the head 5 thereof is provided with an oval enlargement 6 adapted to enter the piece of material 1 and prevent the bolt from rotating, while the threaded end 7 of said bolt is provided with a longitudinal groove 8 having an inclined bottom 9 extending from the end of the bolt in proximity to the threaded surface thereof.

Pivotally mounted in the groove 8 by a transverse pin 10 which does not interrupt the threads of the bolt is an arm 11 having the upper face thereof at the outer end provided with a toothed or threaded enlargement 12, while the end of said arm terminates in a projection 13 serving functionally as a handle. The arm 11 is normally supported in an elevated position by a flat band spring 14 arranged in the groove 8 and secured to the inclined bottom thereof by a screw 15 or other fastening means. When the arm 11 is depressed through the medium of the projection or handle 13, the teeth or threads of the enlargement 12 are adapted to register with the threads of the bolt 3, whereby the nut 4 can be easily screwed upon the bolt.

The nut 4 has the inner threaded wall thereof provided with a longitudinal groove 16 adapted to receive the threaded enlargement 12 of the arm 11, as best shown in Fig. 1, whereby it will be observed that it is impossible to rotate the nut 4 until the outer end of the arm 11 is depressed, when the nut can be easily removed.

While in the drawing I have illustrated what I believe to be a preferred embodiment of my invention, nevertheless, I desire it to be understood that the structural elements thereof can be varied or changed without departing from the spirit and scope of the invention.

Having now described my invention what I claim as new, is:—

1. In a nut lock, the combination of a bolt having the threaded end thereof provided with a longitudinal groove having an inclined bottom extending from the forward end of said bolt to within proximity of the surface of said bolt, a spring pressed arm pivotally mounted in the groove of said bolt, a threaded enlargement projecting from the outer face at the end of said arm, and a nut adapted to screw upon said bolt, said nut having the threaded wall thereof for a portion of its length provided with a longitudinal groove terminating at a point removed from the inner end of the nut and adapted to receive the threaded enlargement of said arm and lock said nut upon said bolt.

2. In a nut locking device, the combination of a bolt having a longitudinal groove formed therein, an arm pivotally mounted in said groove, a threaded enlargement projecting from the outer face of said arm and adapted to have the threads thereof register with the threads of said bolt, a nut adapted to screw upon said bolt, said nut having its inner face for a portion of its length provided with a groove terminating at a point removed from the inner end of the nut and adapted to receive the threaded enlargement of said arm, a handle carried by the outer end of said arm for moving said arm, and means located in the groove of said bolt and adapted to hold said arm in an elevated position.

In testimony whereof I affix my signature in the presence of two witnesses.

FRANK WEINEL.

Witnesses:
 THOS. E. WEINEL,
 A. H. RABSÁG.